Figure 4:
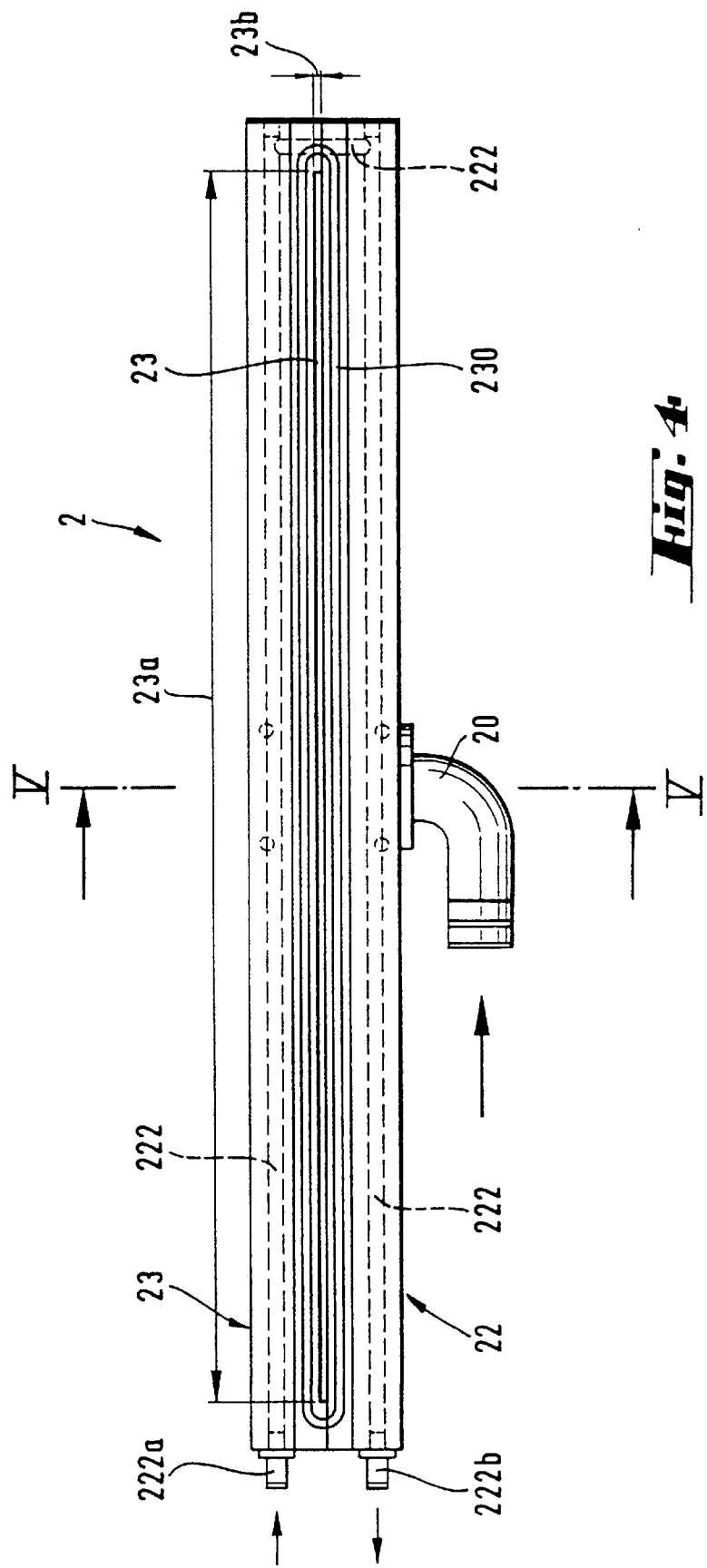

United States Patent [19]
Saner et al.

[11] Patent Number: 6,029,944
[45] Date of Patent: Feb. 29, 2000

[54] CASTING DEVICE AND AN ADAPTER FOR A CASTING DEVICE

[75] Inventors: Niklaus Saner, Hersberg, Switzerland; Paul Terrence Wombwell, Herts, United Kingdom

[73] Assignee: Ciba Specialty Chemicals Corp., Tarrytown, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/894,451
[22] PCT Filed: Feb. 24, 1996
[86] PCT No.: PCT/EP96/00772
 § 371 Date: Dec. 29, 1997
 § 102(e) Date: Dec. 29, 1997
[87] PCT Pub. No.: WO96/27486
 PCT Pub. Date: Sep. 12, 1996

[30] Foreign Application Priority Data

Mar. 7, 1995 [EP] European Pat. Off. .............. 95103241

[51] Int. Cl.$^7$ .................................................. B29C 39/24
[52] U.S. Cl. ........................ 249/105; 249/109; 264/328.4; 264/328.15; 425/543; 425/549; 425/567
[58] Field of Search ............................. 249/79, 105, 109, 249/155; 425/543, 573, 547, 549, 567; 264/297.2, 328.2, 328.14, 328.15, 328.4, 328.6

[56] References Cited

U.S. PATENT DOCUMENTS

| 3,426,116 | 2/1969 | Walters ................................... 425/543 |
| 3,428,289 | 2/1969 | Heckrotte et al. ...................... 425/543 |
| 3,819,312 | 6/1974 | Arpajian ................................... 425/573 |
| 3,837,777 | 9/1974 | Hunten et al. .................. 425/DIG. 227 |
| 4,097,928 | 6/1978 | Fries ........................................ 366/336 |
| 4,309,379 | 1/1982 | Dannels et al. ....................... 264/328.2 |
| 4,318,686 | 3/1982 | Morgan .................................. 425/543 |
| 4,980,111 | 12/1990 | Majerus ............................... 264/328.8 |

FOREIGN PATENT DOCUMENTS

| 0013154 | 7/1980 | European Pat. Off. . |
| 0629483 | 12/1994 | European Pat. Off. . |
| 3801099 | 7/1989 | Germany . |
| 3813576 | 3/1990 | Germany . |
| 1069095 | 5/1967 | United Kingdom . |
| 2014080 | 8/1979 | United Kingdom . |

OTHER PUBLICATIONS

Abstract—vol. 13 No. 13 (M–783) [3361] Jan. 12, 1989 of JP 63–222826.
Abstract—vol. 12 No. 057 (M–670) of JP–A–62 204905.

*Primary Examiner*—Jill L. Heitbrink
*Attorney, Agent, or Firm*—David R. Crichton; Michele A. Kovaleski

[57] ABSTRACT

A casting device with which, by introducing a thermocurable plastics into a heatable casting mould (1), the plastics is thermally cum in that casting mould at least to such a degree that a casting moulded in that manner can be released from the mould, comprises a reservoir for the thermocurable plastics and a feed means for feeding plastics from the reservoir into the casting mould (1), which mould has an inlet opening that extends at least along a substantial portion of the length of the casting to be moulded, wherein the casting device comprises a separate adapter (2) in which the feed means (20, 221, 23) for the plastics is arranged and which can be connected to the casting mould (1) in such a manner that, when the adapter (2) has been connected, an outlet opening (23) provided in the adapter (2) is arranged sealed to and substantially congruent with the inlet opening of the casting mould (1).

20 Claims, 4 Drawing Sheets

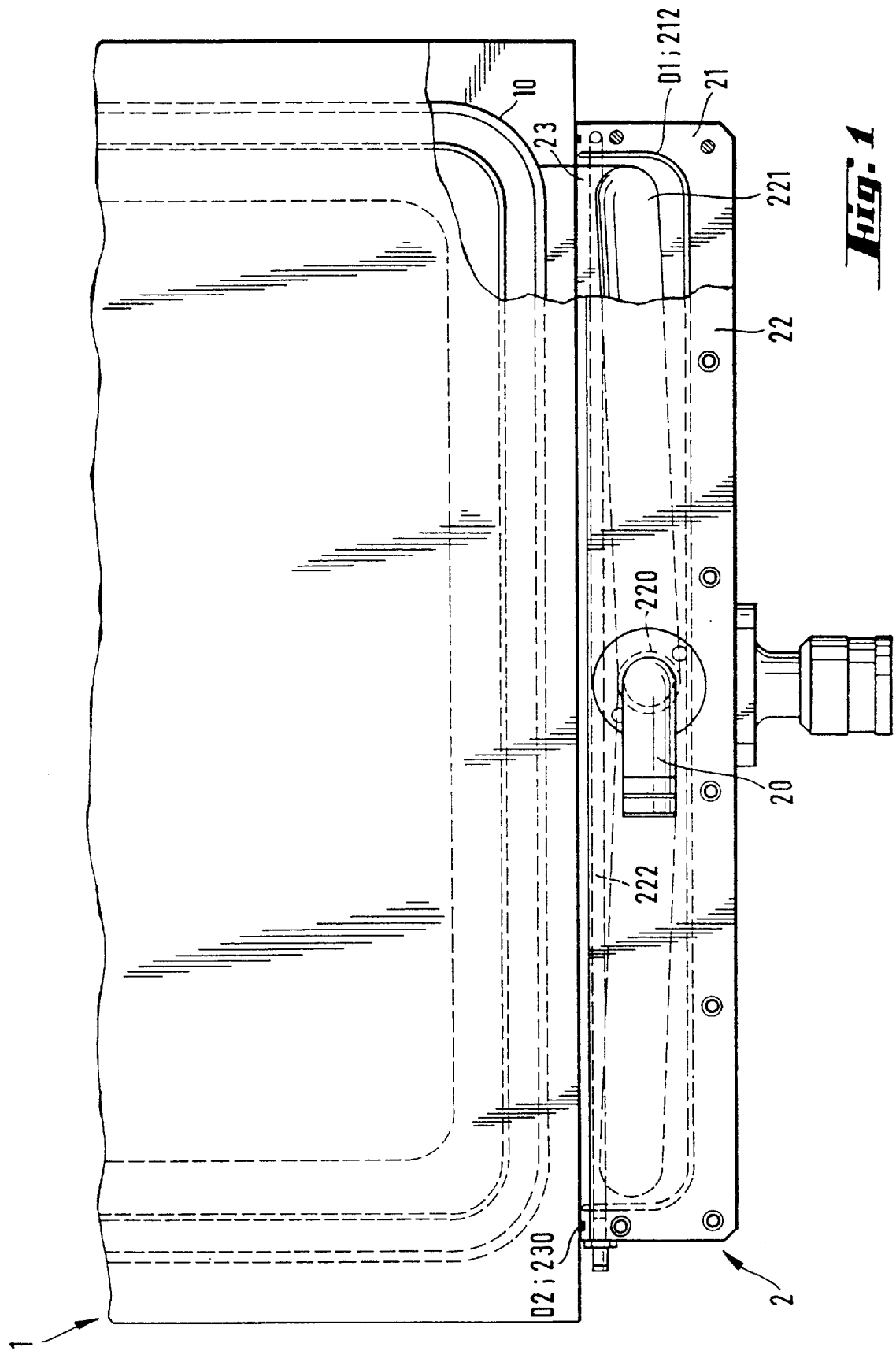

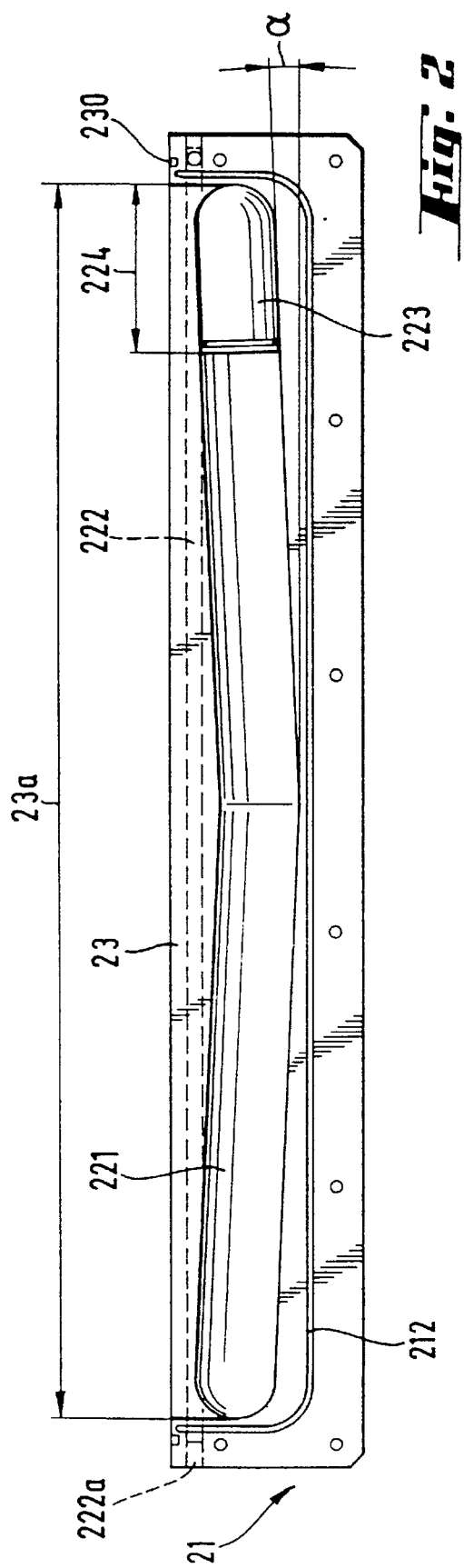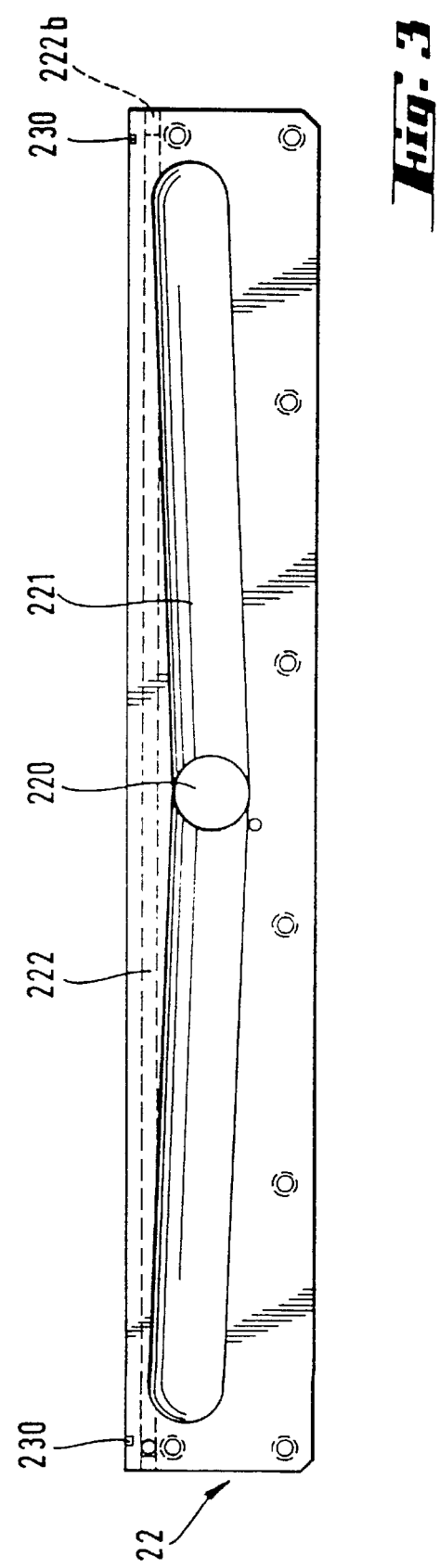

CASTING DEVICE AND AN ADAPTER FOR A CASTING DEVICE

The invention relates to a casting device and an adapter for a casting device according to the preamble of the respective independent patent claim.

Casting devices of that kind are known for the manufacture of a wide variety of castings. Such devices specifically for the manufacture of relatively thin-walled castings, such as plastics basins or similar objects, are known, for example, from the European Patent Application with the publication number EP-A-0 629 483, which describes a method of manufacturing such thin-walled castings, for example decorative panels, and an appropriate casting mould. The inlet opening into the shaping zone of the casting mould, which shapes the future casting, extends similarly over a major portion (30% to 100%) of the length of the shaping zone and of the future casting. This is of advantage insofar as there is as a result no pronounced turbulence of the plastics as it is introduced into the casting mould, and consequently the decorative particles contained in the plastics which is to be cured are prevented from being swirled to such an extent as a result of the turbulence that a visibly inhomogeneous distribution of the decorative particles is produced in the casting.

That process, and the casting mould associated with it, are operationally efficient in principle but do still have certain disadvantages. The feed means, that is to say the channel, through which the thermocurable plastics, for example an epoxy resin, is fed into the shaping zone of the casting mould, is integrated into the mould. Since the mould temperature must lie above the gelation temperature of the epoxy resin, during the manufacture of the casting (during the thermal curing) the epoxy resin in the feed means is likewise thermally cured, adheres to the casting when the casting has been released from the mould and then has to be removed as waste. In view of the fact that the channel extends at least over the length of the inlet opening and beyond, that waste is in some cases very considerable.

Furthermore, the feed means integrated into the casting mould may also become blocked, because the thermal curing process takes place in the feed means too, since (as an integral component of the casting mould) it, too, is heated to a temperature above the gelation temperature. On thermal curing of the plastics in the shaping zone of the casting mould, shrinkage usually occurs during curing, the shrinkage being compensated by the required amount of epoxy resin then being supplied through the feed means (channel) by a corresponding pressure being applied to the liquid epoxy resin. If that channel is completely or partly blocked, the supplementary supply of epoxy resin may be inadequate, which may result in surface shrinkage, cavities or an only incompletely poured casting. Even if that is not the case, however, the (blocked) feed means must nevertheless be cleaned after the manufacture of each casting, which on the one hand incurs expense and on the other hand leaves the casting mould unused for that period of time. In addition, the production of the casting mould is more difficult and more expensive insofar as the feed means, as a component part of the casting mould, has to be recessed into the mould.

An aim of the invention is therefore to eliminate the above-mentioned disadvantages, that is to say to propose a casting device in which as little waste as possible is produced during the manufacture of the castings, in which blockage and subsequent cleaning of the feed means are avoided as fully as possible and in which the manufacture of the casting mould is as simple as possible.

That aim is achieved by a casting device and by an adapter as described in the latter part of the respective independent patent claim.

The casting device according to the invention comprises a separate adapter in which the feed means for the plastics is arranged. The adapter can be connected to the casting mould in such a manner that, when the adapter has been connected, an outlet opening provided in the adapter is arranged sealed to and substantially congruent with the inlet opening of the casting mould. As a result of the fact that the feed means is arranged in a separate adapter. the temperature of the feed means in the adapter can be kept so low that gelation of the plastics in the feed means does not occur. Since the material in the feed means of the adapter does not gel, there is also virtually no, or only a small amount of, cured plastics waste produced that adheres to the casting. In addition, blockage of the feed means can also be avoided in that manner, thereby ensuring a reliable supply of further plastics, which is of great advantage especially in view of the shrinkage compensation that occurs during curing, since to compensate for the shrinkage further plastics has to be fed into the mould. In addition, the manufacture of the casting mould is substantially simplified by that measure, since the feed means no longer has to be recessed into the casting mould as a component part of the casting mould.

The adapter according to the invention has an outlet opening that is so formed that, when the adapter has been connected, the outlet opening of the adapter is arranged sealed to and substantially congruent with the inlet opening of the casting mould. The adapter furthermore has a buffer channel that is of a large size compared with the outlet opening, the buffer channel extending beneath the outlet opening approximately parallel thereto in the working position. As a result of this special arrangement of the buffer channel, no turbulence occurs in the plastics when the casting mould is being filled, so that, especially when the plastics comprises decorative particles, the distribution of those particles is not visibly inhomogeneous.

Especially advantageous further developments of the casting device according to the invention and of the adapter according to the invention are disclosed in the dependent claims. Worthy of special mention is a further development in which the adapter has a separate cooling channel through which a cooling medium (for example a liquid or a gas) can be circulated. That further development additionally increases the above-mentioned positive effects of the invention. Instead of the cooling medium it is also possible for a preheating medium to be circulated through the cooling channel, which then acts as a preheating channel when it is expedient for the adapter to be preheated to an optimum temperature for the casting process.

Figure 5:
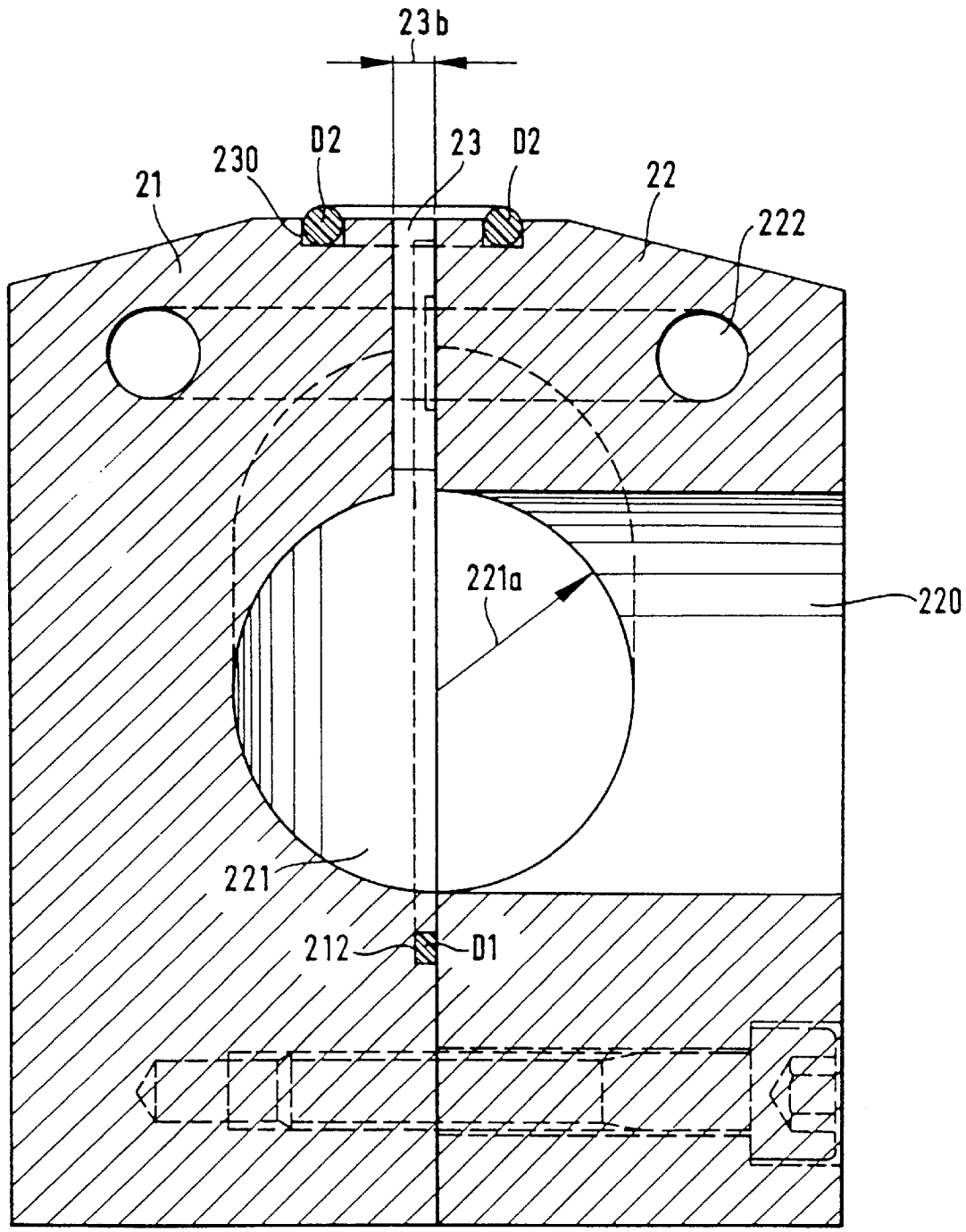

The invention is explained in more detail in the following with reference to the drawings. In those drawings, partly diagramatically and/or in section:

FIG. 1 shows essential parts of an example embodiment of the casting device according to the invention, FIG. 2 shows one half of an example embodiment of the adapter according to the invention, FIG. 3 shows the other half of the example embodiment of the casting mould adapter according to the invention, FIG. 4 shows a plan view of an adapter in the assembled state and FIG. 5 shows a section along the line V–V of FIG. 4 (without connecting pipes).

FIG. 1 shows essential parts of an example embodiment of the device according to the invention in a view from which a reservoir for the plastics, as well as a pump and an associated control means, have been omitted for the purpose of improved clarity. The casting mould 1 can be seen, which is arranged in its working position above an adapter 2 connected to the casting mould 1. The as yet uncured, substantially liquid plastics—in the following an epoxy resin is considered as an example of such a thermocurable plastics—passes by means of a feed pipe (not shown) out of the reservoir through the pipes 20 into the adapter 2. Virtually the entire feed means (details of other components of the feed means are given later) is provided in the adapter 2, which is completely filled with epoxy resin first before the resin can then pass through the outlet opening of the adapter and through the inlet opening of the mould 1 into the mould 1. During operation, the mould 1 is thus filled with resin from below. In FIG. 1, the contours of a casting that is to be produced, in this case a basin 10 of a sink unit, are indicated by way of example using broken lines (for the most part).

A view of one half 21 of the adapter 2 is shown in FIG. 2 and a view of the other half 22 is shown in FIG. 3. The half 22 in FIG. 3 has a feed opening 220, which opens into a buffer channel 221. The other half of the buffer channel 221 is provided in the half of the adapter 2 shown in FIG. 2. At both sides of its centre (i.e. in FIG. 3 at both sides of the feed opening 220) the buffer channel 221 rises gently in an outward direction, for example at an angle of α=2.5°. The function of the gentle incline of the buffer channel 221 will be explained in detail further below.

There can also be seen in FIG. 2 a groove 212 into which a seal D1 (FIG. 5) is fitted when the adapter is assembled so that, after the seal D1 has been fitted in and after the two halves 21 and 22 have been (releasably) connected (for example by means of the symbolically indicated threaded bores for screws), there is a sealed join between the two halves 21 and 22. FIG. 2 and FIG. 3 also show, indicated in each case by broken lines, a separate cooling channel 222 having an inlet 222a and an outlet 222b for a cooling medium, for example a gas or a liquid. The cooling channel 222, and thus the possibility of cooling the adapter 2, is advantageous in the respect that in that manner the adapter 2 can be maintained at a desired temperature. To assist this, the adapter may in addition be precooled in the period in which it is not being used. In that manner it is possible to avoid the problem of the resin gelling in the adapter and preventing the further supply of resin, required especially for compensating shrinkage on gelling or curing, into the mould. Cleaning the adapter between individual casting operations is in this case, moreover, unnecessary, since there are no cured deposits of resin produced in the adapter.

In the assembled state, the adapter 2 has an outlet opening 23 that more or less adjoins the top of the buffer channel 221. This cannot be seen very well in FIG. 2 and FIG. 3, but is clearer in the plan view in FIG. 4 and in the sectional representation of an assembled adapter 2 shown in FIG. 5. It is possible to see in both of those Figures, and especially well in the sectional representation in FIG. 5, the narrow outlet opening 23. It is also possible to see in those Figures that there is provided on the outer face of the casting adapter, which adjoins the casting mould, around the outlet opening 23, a groove 230 into which a seal D2 is fitted before connection to the mould so that, after connection of the adapter to the mould, there is a sealed join between the adapter and the mould. The outlet opening 23 is then congruent with the inlet opening of the mould. The resin passes through that outlet opening 23 and through the corresponding inlet opening of the mould into the mould 1, where the casting is formed. In the case where decorative particles are contained in the resin (for example a "marbled effect"), the width of the outlet opening is at least approximately twice the diameter of the decorative particles.

FIG. 5 also shows clearly that the buffer channel 221 (with its radius 221a, the end of the channel raised on account of the incline is shown by a broken line) is of a large size compared with the outlet opening 23 (width 23b). The result of this comparatively large size of the buffer channel 221 is that a virtually turbulence-free flow of resin prevails through the outlet opening 23 when the mould is being filled. This prevents air-bubble inclusions and/or the formation of cavities, which may result from turbulence, but is also important especially when the resin comprises decorative particles (for example "marbled effect"). If turbulence were to occur in that case, the result of such turbulence might be an undesired visibly inhomogeneous distribution of the decorative particles in the casting produced.

The gentle incline (angle α in FIG. 2), already mentioned, of the buffer channel 221 serves to ensure a homogeneous flow—considered over the length of the outlet opening 23—of epoxy resin through the outlet opening 23 into the mould, so that the resin fed in does not exhibit any "bell-shaped" distribution considered over the length of the buffer channel 221, because the feed opening 220 is arranged in the centre of the buffer channel and only at that site can new resin pass into the buffer channel 221. This is particularly advantageous more especially in those cases where decorative particles are contained in the resin.

Since—as already mentioned—the material in the feed means of the adapter does not gel, there is virtually no waste of cured plastics produced that adheres to the casting. In addition, by means of the adapter 2, blockage of the feed means (pipe 20, buffer channel 221, outlet opening 23) in the adapter 2 can thus be avoided, thereby ensuring a reliable supply of further plastics to the mould, which is of great advantage especially in view of the shrinkage compensation that occurs when the resin gels. In addition, the manufacture of the casting mould is substantially simplified by that measure, since the feed means no longer has to be recessed into the casting mould as a component part of the casting mould.

A further aspect of the device according to the invention and of the adapter 2 according to the invention is described below, again with reference to FIG. 2. That aspect is the basic possibility of limiting the length 23a of the outlet opening 23, it being possible for that to be carried out in a very simple manner by fitting into the buffer channel 221 two stoppers 223, of which in FIG. 2 only one is shown, in the right-hand half of the buffer channel 221. The result is that the buffer channel 221 is filled with resin only as far as the stoppers 223. The stopper 223 may be provided with a rib that seals the outlet opening over the same length 224 as the length over which the stopper 223 seals the buffer channel 221. Thus the length of the outlet opening 23 can be made smaller in a structurally most simple manner, which is especially advantageous from the point of view of it being possible to use the same adapter 2 for casting moulds of different inlet opening lengths without necessitating greater expenditure.

The described adapter 2 may consist, for example, of aluminium or another heat-conducting material. Suitable material for the seals D1 and D2 is, for example, silicone. The stoppers 223 for limiting the length of the outlet opening may be made of polytetrafluoroethylene, better known as Teflon®.

What is claimed is:

1. A casting device with which, by introducing a thermocurable plastics into a heatable casting mould (1), the plastics is thermally cured in said casting mould at least to such a degree that a casting can be released from the mould, sadi casting device having a reservoir for the thermocurable plastics and a feed means for feeding plastics from the reservoir into the casting mould (1), said mould has an inlet opening that extends at least along a substantial portion of the length of the casting to be moulded, characterized in that the casting device comprises an adapter (2) separate from the casting mould in which the feed means (20, 221,23) for the plastics is arranged and said adaptor can be connected to the casting mould (1) by a contact surface which surrounds an outlet opening (23) provided in the adapter (2) and said contact surface is reduced in size in relation to the outer dimensions of the adapter, said outlet opening (23) is arranged sealed to and substantially congruent with the inlet opening of the casting mould (1), where the contact surface of the separate adapter (2) is made small for reduction of heat transfer between said mould (1) and said adapter, and the adapter is not recessed into the mould.

2. A casting device according to claim 1, wherein the adapter (2) has a buffer channel (221) that is of a large size compared with the outlet opening (23) and that, when the adapter (2) has been connected to the casting mould (1), extends beneath the outlet opening (23) approximately parallel thereto.

3. A casting device according to claim 2, wherein the buffer channel (221) is so formed that it rises symmetrically about its centre and wherein there is provided at the lowest point of the buffer channel a feed opening (220) through which the thermocurable plastics enters into the buffer channel (221) during operation.

4. A casting device according to claim 2, wherein means for limiting the length of the buffer channel (221) are provided in the buffer channel.

5. A casting device according to claim 3, wherein means for limiting the length of the buffer channel (221) are provided in the buffer channel.

6. A casting device according to claim 4, wherein the means for limiting the length of the buffer channel are formed by stoppers (223) that can be fitted into the buffer channel.

7. A casting device according to claims 1, wherein the adapter (2) has a separate cooling channel (222) for a cooling medium that can be circulated through the adapter (2).

8. A casting device according to claim 2, wherein the adaptor (2) has a separate cooling channel (222) for a cooling medium that can be circulated through the adaptor (2).

9. A casting device according to claim 3, wherein the adaptor (2) has a separate cooling channel (222) for a cooling medium that can be circulated through the adaptor (2).

10. A casting device according to claim 4, wherein the adaptor (2) has a separate cooling channel (222) for a cooling medium that can be circulated through the adaptor (2).

11. A casting device according to claim 6, wherein the adaptor (2) has a separate cooling channel (222) for a cooling medium that can be circulated through the adaptor (2).

12. An adapter for a casting device that comprises a casting mould (1), said casting mould being heated, and by introducing a thermocurable plastics into the heated casting mould, a casting is produced by thermal curing of the plastics and is then released from the mould, wherein the casting mould (1) has an inlet opening that extends at least along a substantial portion of the length of the casting to be moulded, wherein the adapter (2) is separate from the casting mould and the adapter has an outlet opening (23) that is so formed that when the adapter (2) has been connected it is arranged sealed to and substantially congruent with the inlet opening of the casting mould (1), wherein the adapter (2) has a buffer channel (221) that is of a large size compared with the outlet opening and that extends beneath the outlet opening (23) approximately parallel thereto when the adapter has been connected to the casting mould, and wherein the outlet opening (23) is surrounded by a contact surface for connection with the mould, said contact surface is reduced in size in relation to the outer dimensions of the adapter, where the contact surface of the separate adapter (2) is made small for reduction of heat transfer between said mould (1) and said adapter, and the adapter is not recessed into the mould.

13. An adapter according to claim 12, wherein the buffer channel (221) is so formed that it rises symmetrically about its centre and wherein there is provided at the lowest point of the buffer channel a feed opening (220) through which the thermocurable plastics enters into the buffer channel (221) during operation.

14. An adapter according to claim 12, wherein means for limiting the length of the buffer channel (221) are provided in the buffer channel.

15. An adaptor according to claim 13, wherein means for limiting the length of the buffer channel (221) are provided in the buffer channel.

16. An adapter according to claim 14, wherein the means for limiting the length of the buffer channel (221) are formed by stoppers (223) that can be fitted into the buffer channel (221).

17. An adapter according to claim 12, wherein a separate cooling channel (222) or preheating channel is provided for a cooling medium or preheating medium, respectively, that can be circulated through the adapter (2).

18. An adaptor according to claim 13, wherein a separate cooling channel (222) or preheating channel is provided for a cooling medium or preheating medium, respectively, that can be circulated through the adaptor (2).

19. (New) An adaptor according to claim 14, wherein a separate cooling channel (222) or preheating channel is provided for a cooling medium or preheating medium, respectively, that can be circulated through the adaptor (2).

20. An adaptor according to claim 16, wherein a separate cooling channel (222) or preheating channel is provided for a cooling medium or preheating medium, respectively, that can be circulated through the adaptor (2).

* * * * *